C. B. MARTIN.
EGG BOILER.
APPLICATION FILED JULY 15, 1909.
963,607.
Patented July 5, 1910.
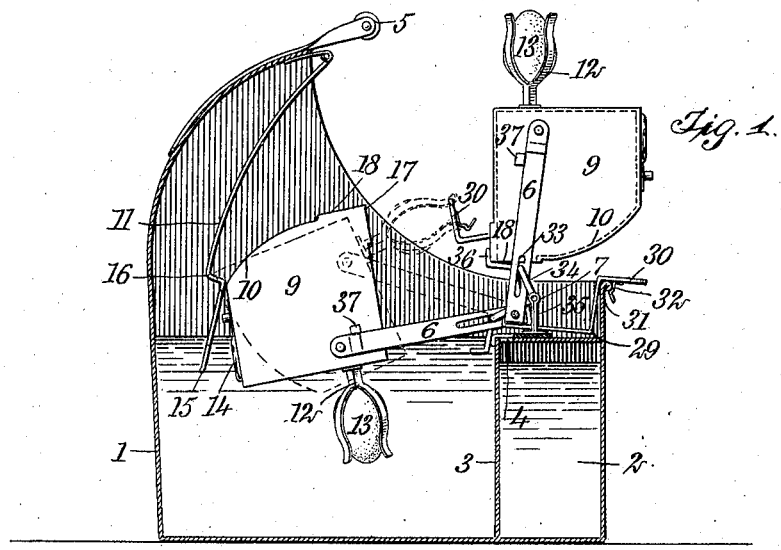
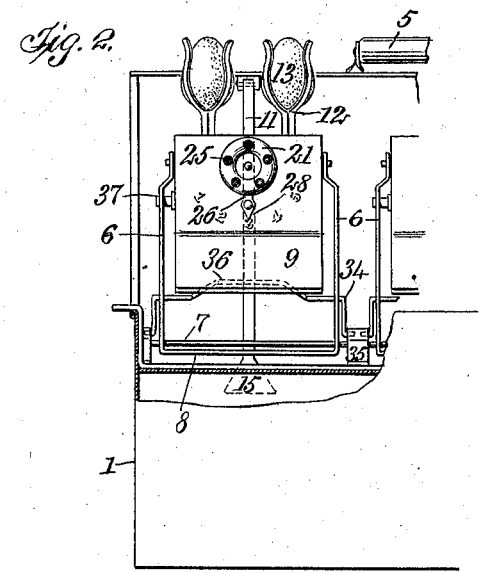
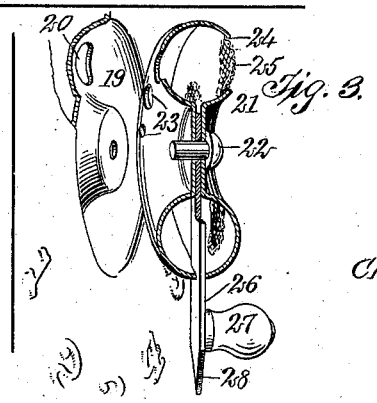
WITNESSES
INVENTOR
Charles B. Martin
BY
Munn & Co.
ATTORNEYS

UNITED STATES PATENT OFFICE.

CHARLES B. MARTIN, OF PORTLAND, OREGON.

EGG-BOILER.

963,607.

Specification of Letters Patent.

Patented July 5, 1910.

Application filed July 15, 1909. Serial No. 507,691.

*To all whom it may concern:*

Be it known that I, CHARLES B. MARTIN, a citizen of the United States, and a resident of Portland, in the county of Multnomah and State of Oregon, have invented a new and Improved Egg-Boiler, of which the following is a full, clear and exact description.

My invention relates to egg boilers, and it has for its object to provide an automatic egg boiler which has a vessel pivoted at one side of its center of gravity, to which the eggs are secured, with an improved valve to permit the water to run into the vessel to rotate it at a predetermined time, and thereby lift the eggs above the water.

An object of the invention is to provide a bar which is adapted to rotate the vessel as it descends into the boiler, the bar having a fan disposed in the water of the boiler to offer some resistance as the vessel contacts with the bar.

Another object of the invention is to provide a reservoir attachment for the boiler, so that the water in the boiler may be kept at a predetermined level.

Another object of the invention is to provide a boiler with means by which it may be readily tilted, so that the water will run from the reservoir to the boiler to which it is connected.

Another object is to provide means to securely hold the vessel suspended.

Still other objects of the invention will appear in the following complete description.

In this specification I will describe the preferred form of my invention, but it will be understood that I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a sectional side elevation of the invention; Fig. 2 is a fragmentary front elevation of the invention, partly in section; and Fig. 3 is an enlarged detail view showing the construction of the valve.

By referring to the drawings, it will be seen that a boiler 1, is provided, having a reservoir 2 at one side, the boiler and the reservoir being separated by a partition 3. There is an opening 4 in the reservoir 2, near the partition 3, so that by tilting the egg boiler by a handle 5, the water in the reservoir 2 may be caused to flow into the boiler 1. Arms 6 are pivoted to rods 7, the arms 6 extending beyond the rods 7 and being connected together by a member 8. To the arms 6 is pivoted a vessel 9 at one side of its center of gravity and near one of its corners, an opposite corner 10 of the vessel being rounded to permit the vessel to rotate as it contacts with a bar 11 when being inserted into the boiler 1. An egg clip 12 is secured to the vessel 9, so that an egg 13 may be held in place to be disposed in the water in the boiler 1 when the vessel 9 is moved into the boiler, and to be lifted from the water as the water enters the vessel 9 through a valve 14, to a sufficient height to change the center of gravity of the vessel and cause it to rotate on the arms 6. A fan 15 is secured to the bottom of the bar 11, to offer some resistance to the water and prevent the bar 11 from moving too far away from the vessel as the vessel 9 is moved into the water. It will be understood that a bent portion 16 of the bar 11 contacts with a corner 17 of the vessel 9 as the vessel is moved into the boiler, to rotate the vessel 9 on the arms 6 and cause the egg clip 12 with the egg 13 therein, to be disposed in the water in the boiler. There is an opening 18 in the vessel so that when the vessel is held suspended out of the water, the water will flow from the vessel into the reservoir 2 and into the boiler 1.

The valve 14 is constructed in the following manner: There is an annular depression 19 in the vessel 9 and in this annular depression there is an opening 20. The valve proper 21, consists of an annular hollow body, which is pivoted by means of a pin 22, to rotate in the annular depression 19, there being a plurality of openings 23 graduated in size, each of which is adapted to face the opening 20 in the annular depression as the annular hollow body is rotated. There are also openings 24 in the outer side of the annular hollow body, these openings 24 being covered by screens 25 to prevent foreign materials from entering the annular hollow body which would interfere with the operation of the valve. The annular hollow body has an arm 26 which is secured between its halves in the construction shown in the drawings, and this arm 26 has a handle 27, by which it may be operated.

On the front of the vessel 9, there are numbers from 1 to 5, as is best shown in Fig. 2, these numbers indicating the length of time that the egg will be boiled when a pointer 28 on the arm 26 is moved in alinement with the respective number. When the pointer 28 is moved to the number 1, the valve 21 is rotated until the largest of the openings 23 is disposed face to face with the opening 20, thus permitting the water to enter the vessel 9 with great rapidity and quickly change the center of gravity, thereby causing the vessel 9 to rotate on its arm 6 and to lift the egg clip 12 with the egg 13 therein above the water. When the pointer 28 is moved to the number 5, the smallest of the openings 23 is moved in communication with the opening 20, so that the water will enter the vessel 9 much more slowly, thereby delaying its rotation. Secured to the member 8, connecting the arms 6 is an operating lever 29, which is bent so that its handle 30 is disposed above the rim 31 of the automatic egg boiler. A spring clip 32 is secured to the handle 30, the spring clip engaging the rim 31 to hold secure the lever 29 until it is moved by the operator. There are longitudinally disposed slots 33 in the arms, through which is disposed a retainer 34, the retainer 34 being pivoted to uprights 35 and having its central portion 36 disposed around the back of the bottom of the vessel 9 when the vessel 9 is held suspended above the reservoir 2, but which is moved out of engagement with the vessel when the lever 29 is moved by its handle 30 to dispose the vessel in the boiler 1. A stop 37 on the vessel 9, limits the rotary movement of the vessel relatively to the arms 6, as the stop 37 contacts with one of the arms 6 when the egg clip 12 is downwardly disposed, and the stop 37 contacts with the other side of the arm 6 when the vessel is suspended above the reservoir 2 with the egg clip disposed upwardly.

In the operation of my invention, the pointer 28 is moved with the arm 26 by means of the handle 27, until it points to the number indicating the number of minutes that the egg is to be boiled. The egg 13 is then disposed in one of the clips 12, and by means of the handle 30, the lever 29 is moved upwardly thereby throwing the arms 6 backwardly with the vessel 9 pivoted thereto. As the vessel 9 moves rearwardly, the corner 17 contacts with the bent portion 16 of the bar 11, thereby causing the vessel 9 to rotate, which is permitted by reason of the fact that the corner 10 of the vessel 9 is rounded, thereby preventing any stoppage of the rotation by means of the bar 11. As the vessel 9 rotates, the egg clip 12 is disposed in the water in the boiler 1, and it is held in a predetermined position by means of the stop 37 on the side of the vessel 9, which contacts with one of the arms 6. When in this position the water enters the vessel 9 through the valve 14, and when the water rises to a predetermined level in the vessel 9, the center of gravity is changed, thereby causing the vessel to rotate and lifting the egg clip 12 above the water. The vessel 9 is then lifted to an upright position above the reservoir 2, by means of the arms and the lever 29 which is secured to the member 8 connecting the arms 6. When the vessel 9 is disposed above the reservoir 2, the water will run from the vessel 9 through the opening 18 therein, the water running into the reservoir 2 and into the boiler 1. To insure that the water in the boiler is at the proper level, the operator tilts the automatic egg boiler rearwardly by means of the handle 5, thereby causing the water in the reservoir 2 to flow through the opening 4 into the boiler 1, and when the automatic egg boiler is permitted to assume its normal position again, the excess water will flow back in the reservoir 2 through the opening 4. When the vessel 9 is suspended above the reservoir 2, the central portion 36 of the retainer 34 will hold it in position.

Having thus described my invention, I claim as new and desire to secure by Letters Patent:

1. In an automatic egg boiler, a boiler, a vessel adapted for rotating disposed in the boiler, means on the vessel for holding an egg, said vessel having an opening and a valve adapted for controlling the opening, the valve consisting of an annular hollow body pivoted for rotating in an annular depression in the vessel, the said opening being in the said annular depression, there being an opening in the inner side of the annular hollow body which is adapted for communicating with the opening in the vessel, there being also an opening in the outer side of the annular hollow body.

2. In an automatic egg boiler, a boiler, a vessel adapted for rotating disposed in the boiler, means on the vessel for holding an egg, said vessel having an opening and a valve adapted for controlling the opening, the valve consisting of an annular hollow body pivoted for rotating against the vessel, there being an opening in the inner side of the annular hollow body which is adapted for communicating with the opening in the vessel, there being also an opening in the outer side of the annular hollow body.

3. In an automatic egg boiler, a boiler, a vessel pivoted for rotating disposed in the boiler, means on the vessel for holding an egg, an annular depression in the outer side of the vessel in which there is an opening leading to the interior of the vessel, a valve adapted for controlling the opening, the valve consisting of an annular hollow body pivoted to rotate in the annular depression, there being a plurality of openings of different sizes in the inner side of the annular hollow body, each of the openings being adapted for communicating with the opening in the vessel, there being also an opening in the outer side of the annular hollow body, and a netting which covers the last named opening.

4. In an automatic egg boiler, a boiler, a reservoir, a partition separating the two elements, a vessel pivotally connected to the boiler and adapted to be disposed therein, means on the vessel for holding the egg, and means by which the automatic egg boiler may be readily tilted to permit the water to run from the reservoir to the boiler.

5. In an automatic egg boiler, a boiler, pivoted arms, a vessel pivoted to the arms at one side of its center of gravity, and adapted to be disposed in the boiler, means on the vessel for holding an egg, a bar pivoted to the automatic egg boiler, which is adapted for contacting with the vessel as it is moved into the boiler, and a fan on the bar adapted for checking the movement of the bar on contact with the vessel.

6. In an automatic egg boiler, a boiler, pivoted arms, a vessel pivoted to the arms at one side of its center of gravity, and adapted to be disposed in the boiler, means on the vessel for holding an egg, a bar pivoted to the automatic egg boiler, to contact with the vessel as it is moved into the boiler, a fan on the bar which is adapted for checking the movement of the bar on contact with the vessel, said vessel having an opening, and a valve adapted for controlling the opening, the valve consisting of an annular hollow body adapted for rotating in an annular depression in the vessel, the said opening being in the said annular depression, there being an opening in the inner side of the annular hollow body which is adapted for communicating with the opening in the vessel, there being also an opening in the outer side of the annular hollow body.

7. In an automatic egg boiler, a boiler, pivoted arms, a vessel pivoted at one side of its center of gravity to the arms, and adapted to be disposed in the boiler, means on the vessel for holding an egg, means for rotating the vessel as it is moved into the boiler, said vessel having an opening, and a valve adapted for controlling the opening, the valve consisting of an annular hollow body adapted for rotating against the vessel, there being an opening in the inner side of the annular hollow body which is adapted for communicating with the opening in the vessel, there being also an opening in the outer side of the annular hollow body.

8. In an automatic egg boiler, a boiler, pivoted arms, a vessel pivoted at one side of its center of gravity to the arms, and adapted to be disposed in the boiler, means on the vessel for holding an egg, means for rotating the vessel as it is moved into the boiler, said vessel having an opening, and a valve adapted for controlling the opening, the valve consisting of an annular hollow body adapted for rotating against the vessel, there being an opening in the inner side of the annular hollow body which is adapted for communicating with the opening in the vessel, there being also an opening in the outer side of the annular hollow body, there being slots in the pivoted arms, and a pivoted retainer which is passed through the slots and is adapted for engaging the vessel and holding it firmly to permit the operator to adjust the valve.

9. In an automatic egg boiler, a boiler, pivoted arms, a vessel pivoted at one side of its center of gravity to the arms, which is adapted to be disposed in the boiler, means on the vessel for holding an egg, means for rotating the vessel as it is moved into the boiler, an opening in the vessel, a valve adapted for commanding the opening, there being slots in the pivoted arms, a pivoted retainer which passes through the slots and is adapted for engaging the vessel and holding it firmly to permit the operator to adjust the valve, a handle which is adapted for operating the arms, and a spring clamp on the handle which is adapted for engaging the rim of the automatic egg boiler.

10. In an automatic egg boiler, a boiler, pivoted arms, a vessel pivoted at one side of its center of gravity to the arms which is adapted to be disposed in the boiler, means on the vessel for holding an egg, means for rotating the vessel as it is moved into the boiler, an opening in the vessel, a valve adapted for commanding the opening, there being slots in the pivoted arms, and a pivoted retainer which passes through the slots and is adapted for engaging the vessel and holding it firmly to permit the operator to adjust the valve.

11. In an automatic egg boiler, a boiler, pivoted arms, a vessel pivoted at one side of its center of gravity to the arms, which is adapted to be disposed in the boiler, means on the vessel for holding an egg, there being an opening in the vessel, there being slots in the pivoted arms, and a pivoted retainer which passes through the slots and is adapted for engaging the vessel and holding it in position.

12. In an automatic egg boiler, a boiler, pivoted arms, a hollow vessel pivoted to the arms, an egg holder thereon, there being a water inlet in the hollow vessel to permit water to enter to change its center of gravity so that it will rotate and the eggs will be submerged, the water inlet being in an annular depression in the outer side of the vessel, an annular hollow valve pivoted to rotate in the annular depression, there being an opening in the inner side of the annular hollow valve which is adapted for communicating with the opening in the annular depression, there being also an opening in the outer side of the annular hollow body and a netting which covers the last named opening.

13. In an automatic egg boiler, a boiler, pivoted arms, a hollow vessel pivoted to the arms, slots in the pivoted arms, a pivoted retainer which passes through the slots and is adapted for engaging the vessel and holding it firmly, an egg holder on the hollow vessel, there being a water inlet in the hollow vessel to permit water to enter to change the center of gravity of the hollow vessel so that it will be rotated and the eggs will be submerged, an annular depression in the outer side of the vessel in which the water inlet is disposed, and a valve consisting of an annular hollow body pivoted to rotate in the annular depression, there being a plurality of openings of different sizes in the inner side of the annular hollow body, each of the openings being adapted for communicating with the opening in the vessel, there being also an opening in the outer side of the annular hollow body, and a netting which covers the last named opening.

14. In an automatic egg boiler, a boiler, pivoted arms, a vessel pivoted to the arms, which is adapted to be disposed in the boiler, means on the vessel for holding an egg, there being an opening in the vessel, there being slots in the pivoted arms, a pivoted retainer, which passes through the slots and is adapted for holding the vessel in position, and a handle, which is adapted for operating the arms.

In testimony whereof I have signed my name to this specification in the presence of two subscribing witnesses.

CHARLES B. MARTIN.

Witnesses:
 CLIFFORD L. REED,
 NELLIE HALEY.